March 3, 1964  J. R. MOORE  3,123,555
AUTOMATIC SEWAGE DISPOSAL FOR INDIVIDUAL HOMES AND BUILDINGS
Filed May 3, 1961  2 Sheets-Sheet 1

INVENTOR.
JOHN R. MOORE
BY *Ely, Frye & Hamilton*
ATTORNEYS

March 3, 1964 J. R. MOORE 3,123,555
AUTOMATIC SEWAGE DISPOSAL FOR INDIVIDUAL HOMES AND BUILDINGS
Filed May 3, 1961 2 Sheets-Sheet 2
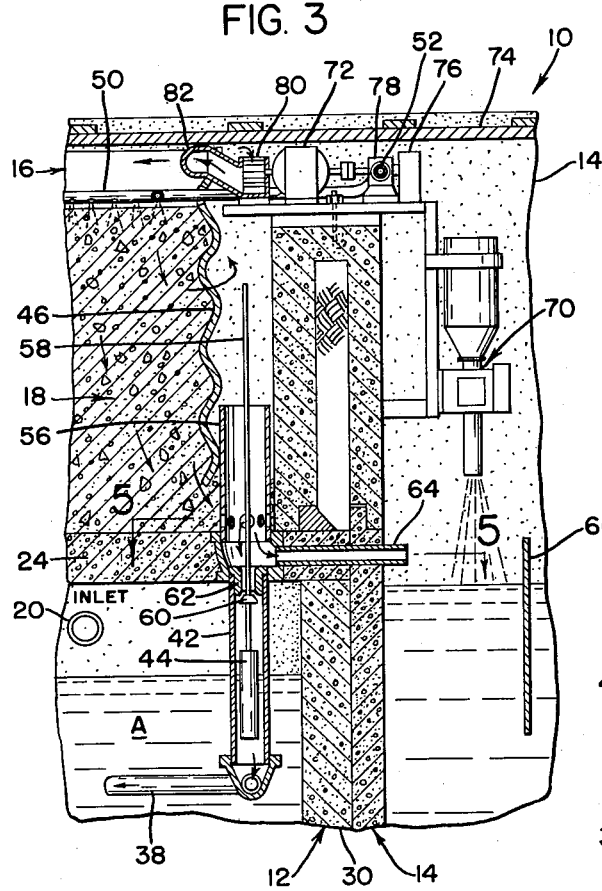
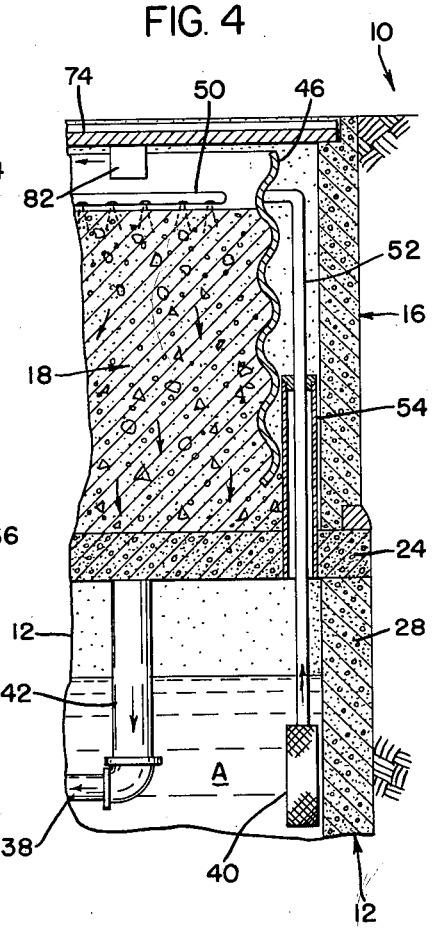
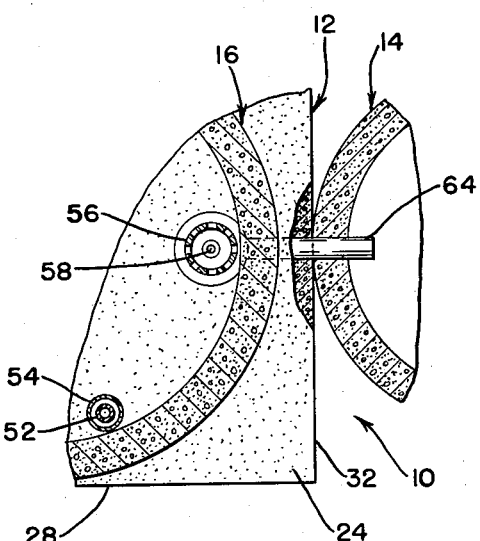
INVENTOR.
JOHN R. MOORE
BY
ATTORNEYS United States Patent Office 3,123,555
Patented Mar. 3, 1964

3,123,555
AUTOMATIC SEWAGE DISPOSAL FOR INDIVIDUAL HOMES AND BUILDINGS
John R. Moore, 82 Casterton Ave., Akron 3, Ohio
Filed May 3, 1961, Ser. No. 107,347
3 Claims. (Cl. 210—124)

The present invention relates to an improved form of structure and method for the conversion of raw sewage into stable, inoffensive end products. More particularly, the invention is directed to a composite automatic disposal unit and process for the treatment of raw sewage from homes and small commercial establishments.

The usual and commonly known means of disposing of domestic raw sewage in areas where there are no established sewage disposal plants is a septic tank system for each home or building. Generally, such a system requires a main tank or receptacle for collecting the direct flow of raw sewage influent from the home or small commercial establishment. The main tank or receptacle has effluent outflow to some type of filter bed, leach well, leach tank or tile fields which are spaced a predetermined distance from and connected to the main tank depending upon the porosity of the soil. Thus, the septic tank system requires a large area of ground to operate effectively.

It is also possible that the ultimate effluent from the septic tank system may retain some putrescent and septic matter which may find its way into a sandy fissure in the earth, polluting wells from which drinking water is obtained or finding its way into streams, rivers and the like, giving off noxious odors.

One object of the invention is to obviate the necessity of systems requiring remotely spaced leach wells, tile fields and the like by providing a single composite unit designed to be confined only to that area occupied by the unit itself, thereby requiring considerably less area than that of the average septic tank system.

Another object of the invention is to treat raw sewage in such manner as to convert the impure, offensive and putrescent organic matter into a stable effluent with inoffensive end products, thereby enabling such resultant effluent to be safely passed out into nearby storm ditches, streams and the like, without harm.

A further object of the invention is to provide a unit which is automatic in operation, requiring inspection only at predetermined intervals and being economical to maintain.

Other objects inherent in the nature of the invention will become apparent from the drawings and the description which follows.

In the drawings:

FIG. 3 is a fragmentary enlargement of FIG. 2 in section.

FIG. 4 is a fragmentary section taken along line 4—4 of FIG. 1;

FIG. 5 is a fragmentary section taken along line 5—5 of FIG. 3.

Figure 1:
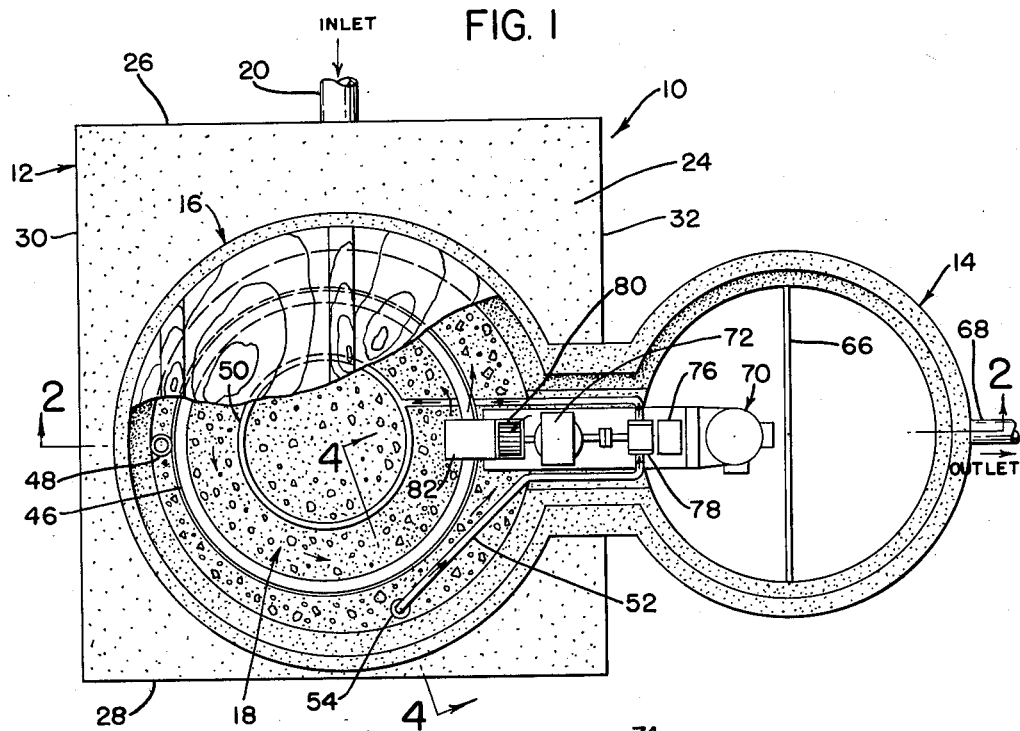
FIG. 1 is a plan view of the composite automatic sewage disposal unit partially broken away.

The automatic composite sewage disposal unit is indicated generally by the numeral 10. A fluid medium containing raw sewage is confined in the unit whereby substantially all precipitatable matter settles out leaving a polluted liquid, which liquid is transformed into a partially purified effluent by aerobic fermentation; the partially purified effluent is then treated chemically to cause flocculable matter to aggregate and settle out, and to kill remaining septical organics.

The unit comprises basically a first or primary settlement tank 12, a secondary or final settlement tank 14 and a filter compartment 16 above tank 12 within which is arranged a gelatinous or biologically active filter bed 18. The terms "gelatinous" or "biologically active" are commonly accepted terms in this particular art and have reference to any type filter construction on which aerobic microorganisms have adhered and have formed a bacterial jelly interface called "zoogloea."

The first and secondary settlement tanks are in side-by-side juxtaposed relation and the filter compartment is contiguous to the upper portion of the secondary tank and is positioned directly above the first tank. This structural arrangement is deemed advantageous in furthering such desirable objects of economy and achieving a compact unit. Other advantages will become evident as the description continues.

The raw sewage enters the first or primary settlement tank 12 in a fluid medium, such as water, through an influent conduit 20 which leads from the house or commercial establishment. The primary settlement tank illustrated in the preferred embodiment is fabricated from concrete and has a rectangular box-like configuration. However, the particular shape or material out of which the primary tank is fabricated is unimportant; therefore, any other suitable material and shape may be employed.

Figure 2:
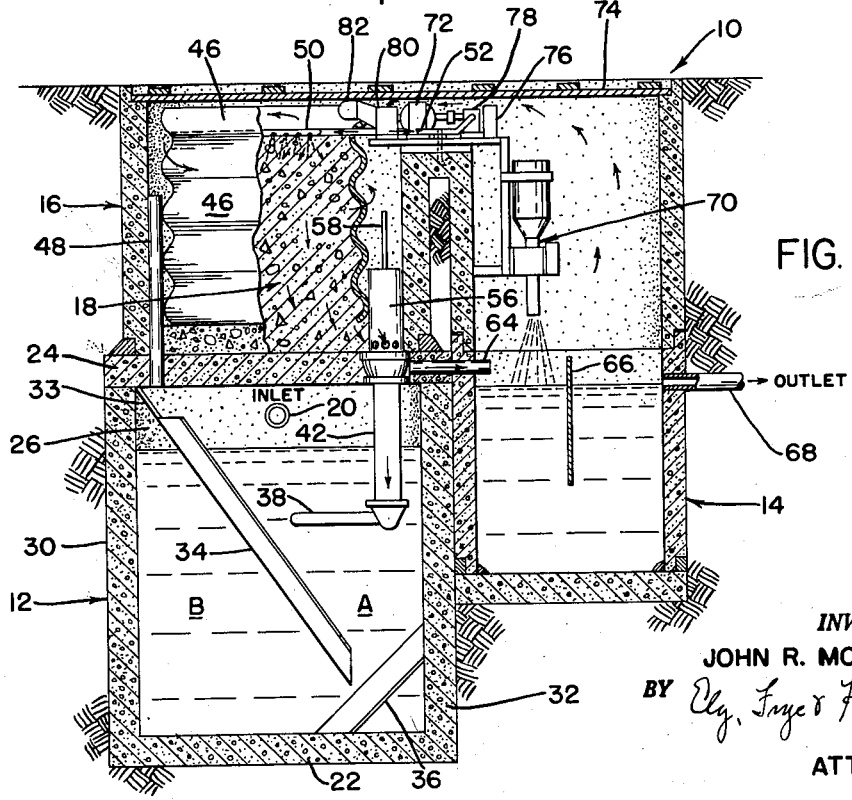
FIG. 2 is a sectional elevation taken along line 2—2 of FIG. 1, partially broken away and on a reduced scale.

The primary tank which is illustrated in FIG. 2 of the preferred embodiment may be designed for a capacity of approximately 1000 gallons dependent upon the average daily service requirements, and has a bottom wall 22, overhead wall 24, end walls 26, 28 and sidewalls 30, 32. Within the tank and extending from end wall 26 to end wall 28 within slots 33 provided in the end walls is an inclined baffle 34. The baffle defines a partial diagonal from the direction of an upper corner edge of the tank formed by the intersection of sidewall 30 and overhead wall 24 toward the opposite lower corner. The lower end of the inclined baffle is slightly spaced from and perpendicular to a deflector baffle 36 which extends diagonally across the said opposite corner.

The arrangement of the inclined and deflector baffles permits the maintenance of a relatively quiescent sedimentation zone A in order that the settleable solids and other precipitatable matter will drop to the bottom 22 and beneath the inclined baffle. Inasmuch as it is characteristic of the anaerobic microorganisms in such sewage matter to generate gases as byproducts, the turbulence of such gaseous generation is confined in a zone B beneath the inclined baffle 34 and thus does not interfere and prevent settlement of precipitatable matter in the incoming influent. The generated gases pass out through the influent conduit 20 which is generally vented in the house or establishment through a soil stack or the like on the roof.

Also arranged within the primary settlement tank 12 is a recirculation return conduit 38, a pump intake and foot valve 40, and a float valve housing conduit 42 for a float valve 44 connected to conduit 38 to control recirculation of the sewage, the purpose of recirculation to be discussed later.

The filter compartment 16 of the preferred embodiment is illustrated as being cylindrical in configuration and may be fabricated from concrete. Obviously, the compartment is not limited to any particular shape and material. A generally cylindrical steel corrugated inner retaining wall 46 is illustrated in FIGS. 2–4 and is utilized as a matter of economy in conserving space and cost as well as providing a strong and durable structure to confine the gelatinous filter bed 18. The media of the filter bed is preferably gravel or crushed stone aggregate, although vitrified tile, wood slats and other suitable material may be effectively employed.

Between the corrugated retaining wall 46 and the wall of the filter compartment is a capped primary settlement clean-out pipe 48 interconnecting the filter compartment with the primary settlement tank. As may be observed from FIG. 2, the pipe 48 opens into the primary tank at a point above the upper end of the inclined baffle 34 which is spaced from the upper corner edge. This arrangement permits the sediment in zone B behind the baffle 34 to be periodically pumped out.

It will also be observed from FIGS. 2-4 that the corrugated retaining wall 46 only extends part way toward the bottom of the filter compartment thereby permitting the aggregate media to spread outwardly around the bottom of the compartment. The purpose of this arrangement will become evident later.

Located above the gelatinous filter bed 18 is a preferably circular fixed spray distributor nozzle unit 50 which is connected to the pump intake and foot valve 40 in the primary settlement tank 12. The conduit 52 which interconnects the pump intake and foot valve 40 and the nozzle unit 50 passes through a pipe 54, which is sealed at its upper end around the interconnecting conduit and opens into the primary settlement tank at its lower end.

At a point approximately diametrically opposite to the clean-out pipe 48 is a pipe 56 which is open at its upper end and apertured around its lower end, and connected to the conduit 42 which leads to recirculation return conduit 38. Pipe 56 serves a dual function of permitting effluent passing from the filter bed to go either to the final settlement tank or back to the primary settlement tank through the recirculation return pipe 38, which has its opening at a point proximate to end wall 26 below influent conduit 20, and permits the control rod 58 from the float valve to pass upwardly a sufficient distance to enable a person to grasp same and pull the float valve out for inspection.

As may be observed from FIG. 3 the float valve 44 is controlled by the water level in the primary settlement tank. When the level reaches a predetermined height a valve seat 60, preferably of rubber, is caused to seal one end of a valve gasket 62 and thereby permit the filter effluent to flow into the final settlement tank 14. The water level at which the rubber valve seat will be caused to move into sealing position may be determined by adjusting the distance between the float valve and the valve seat along the rod 58.

The valve gasket 62, preferably of lead, is designed to readily seat itself in position at the end of the float valve housing conduit 42 and is caused to be lifted out by the abutment of valve seat 60 thereagainst when the float valve 44 is raised for inspection.

The apertured end of pipe 56 extends below the steel corrugated retaining wall 46 and is substantially surrounded by the aggregate media which has been spread outwardly around the bottom of the filter compartment. Inasmuch as the apertures are equally spaced around the end of the pipe and the end of the pipe is surrounded by the aggregate media, a greater flow of filtered effluent into pipe 56 is facilitated. As previously stated, the pipe 56 permits the filtered effluent to pass either to the primary settlment tank or to the final settlement tank. An effluent inflow conduit 64 connects the filter compartment 16 with the final or secondary settlement tank 14.

The final settlement tank of the preferred embodiment is cylindrical, although other configurations may be used just as effectively. A vertical obstruction baffle 66 within the tank extends from side to side across the final settlement tank at right angles with respect to the effluent inflow conduit 64 and an effluent outflow conduit 68 and partially above the normal water level. The water level of the secondary tank is determined by the positioning of the effluent outflow conduit. The vertical obstruction baffle prevents the incoming effluent from flowing immediately out through the effluent outflow conduit before it has been treated and in effect divides the tank into two sections. It may be observed from FIG. 2 that the effluent inflow conduit 64 is on a level above that of the effluent outflow conduit 68 and above the normal water level to prevent backflow. The effluent outflow conduit permits gradual outflow as the water level rises.

In the upper region of the final or secondary settlement tank is an automatically time-controlled conventional chemical feeder 70 which supplies either a dry calcium hypochlorite or a sodium hypochlorite to the effluent in the settlement tank at predetermined intervals. The automatic chemical feeder is vertically disposed above that section of the secondary tank as partially divided by the baffle 66 adjacent to the effluent inflow conduit 64. Although no details of the feeder are shown, the feeder may comprise a rotating piston with holes or jets cut into it, which holes or jets can be varied in size in order to vary the quantity of the chemical to be fed. The feeder is motivated by a self-contained electric motor and time clock (not shown).

The resulting sewage effluent from the filter contains suspended particles and matter, most of which are not susceptible to sedimentation. Some of the matter constitutes flushings of excess accumulations of zoogloea from the filter. The effluent flowing into the seondary settlement tank is thus in a state of turbidity. The function of a dry calcium hypochlorite or sodium hypochlorite is two-fold. It changes the ionization of the effluent so that the suspended particles are flocculated or aggregated into heavier masses whereby they settle to the bottom of the tank, and it kills the residual septical organics.

An electric motor 72, which is illustrated in FIGS. 2 and 3 as being located atop the separating walls intermediate the filter compartment and final settlement tank and beneath the platform cover 74 is energized at intervals throughout a twenty-four hour period of a day by a time clock 76. The time clock 76 and electric motor 72 serve to operate the pump 78 for causing the effluent from the primary settlement tank to be brought up through pipe 52 into the spray nozzles. If the amount of sewage to be treated is sufficiently small that continuous operation is not needed, then the time clock will also cause the pump to be periodically energized.

An air circulator 80 and an air duct 82 are also operated by the time clock and electric motor so as to force air down through the filter in order to provide oxygen for the aerobic microorganisms which require it. Inasmuch as the automatic sewage disposal unit 10 has been so arranged with respect to the location of the filter compartment and final settlement tank with an interconnecting space beneath the platform cover therefor between the two areas, the air circulator is able to draw its air supply from both the final settlement tank and the open areas in the filter compartment as indicated by the arrows. The platform cover is not air-tight, but has openings therein in that portion of the cover directly above the final settlement tank. There are no openings in the cover above the filter compartment. The arrangement permits a good circulation of oxygen for the aerobic microorganisms and prevents any noxious odors from emanating from the vicinity of the filter compartment.

The operation of the composite automatic sewage disposal unit is as follows:

The raw liquid sewage influent flows into the primary settlement tank 12 through the influent conduit 20. Substantially all the matter which is subject to precipitation settles out to the bottom of the tank leaving a polluted liquid in the upper regions of the tank. When the liquid sewage reaches a predetermined level above the foot valve 40, the time clock of the chemical feeder and the time clock 76 are set by the operator to control the subsequent periodic operation of the pump 78, air circulator 80 and chemical feeder.

Suction acts on the polluted liquid through the foot valve 40 and the liquid is pumped upwardly to be distributed over the biologically active filter by the spray distributor nozzle unit 50. The liquid percolates through the gelatinous filter, which decreases the biologic oxygen demand of the polluted liquids, and then is permitted to return to the primary settlement tank via the recirculation return conduit 38. Inasmuch as the sealing of the lead valve gasket 62 by the rubber valve seat 60 is controlled by the action of the float valve 44 as determined by the water level in the primary tank, there will be times when a small portion of the partially purified effluent from the filter will be permitted to trickle directly into the final settlement tank 14. However, a major portion of the filtered effluent will flow back into the primary tank where it is necessarily admixed with the incoming influent. In this manner the liquid sewage may be recirculated a number of times before it passes into the final settlement tank. The continued recirculation and admixture of the filtered or partially purified effluent with the incoming raw sewage serves not only to keep the filter wet in order to keep the aerobic microorganisms alive, but also serves to bring them food on which they feed. It is because of this manner by which recirculation is continued that the unit can be inactive for weeks at a time without fresh incoming raw sewage. For example, a family could leave on vacation and there would be no danger of the aerobic microorganisms dying through inactivity.

The chemical feeder 70 is periodically energized and feeds either sodium or calcium hypochlorite to the partially purified effluent coming from the biologically active filter. The chemical serves to ionize the liquid in the final settlement tank and cause flocculable matter to aggregate and settle out to the bottom, and kills the remaining septical organisms.

The ultimate effluent trickling out through the outflow conduit 68 is sufficiently clarified and rendered innocuous both in odor and septical organics that it may be permitted to flow into storm ditches, storm sewers, or if permitted by law, to flow into streams or rivers without harm.

What is claimed is:

1. An automatic sewage disposal unit comprising:
  a primary settlement tank for receiving liquid raw sewage;
  a filter compartment disposed above said primary settlement tank and containing a biologically active filter bed;
  a final settlement tank disposed adjacent one of said primary settlement tank and filter compartment;
  means for conveying the liquid from said primary settlement tank to said filter compartment and distributing it over said filter bed;
  and means for conducting the liquid from said filter bed either in return to said primary settlement tank for recirculation from the latter to said filter bed or to said final settlement tank, said conducting means comprising:
    a first conduit having an inlet in the filter compartment and an outlet in the primary settlement tank and forming a first interconnecting passageway between said filter compartment and said primary settlement tank;
    a second conduit having an inlet in said first conduit and an outlet in the final settlement tank and forming a second interconnecting passageway between said filter compartment and said final settlement tank;
    and valve means (a) adapted to close the outlet of said first conduit when the liquid in said primary settlement tank rises to a predetermined level, as a consequence of which liquid passes from said filter compartment through said second interconnecting passageway into said final settlement tank, (b) and further adapted to open the outlet of said first conduit when the liquid in said primary settlement tank falls below said predetermined level, as a consequence of which liquid passes from said filter compartment through said first interconnecting passageway bypassing the inlet to said second conduit and into said primary settlement tank.

2. An automatic sewage disposal unit comprising:
  a primary settlement tank for receiving liquid raw sewage;
  a filter compartment disposed above said primary settlement tank and containing a biologically active filter bed;
  a final settlement tank disposed adjacent one of said primary settlement tank and filter compartment;
  means for conveying the liquid from said primary settlement tank to said filter compartment and distributing it over said filter bed;
  means for conducting the liquid from said filter bed either in return to said primary settlement tank for recirculation from the latter to said filter bed or to said final settlement tank, said conducting means comprising:
    a first conduit having an inlet in the filter compartment and an outlet in the primary settlement tank and forming a first interconnecting passageway between said filter compartment and said primary settlement tank;
    a second conduit having an inlet in said first conduit and an outlet in the final settlement tank and forming a second interconnecting passageway between said filter compartment and said final settlement tank;
    and valve means (a) adapted to close the outlet of said first conduit when the liquid in said primary settlement tank rises to a predetermined level, as a consequence of which liquid passes from said filter compartment through said second interconnecting passageway into said final settlement tank, (b) and further adapted to open the outlet of said first conduit when the liquid in said primary settlement tank falls below said predetermined level, as a consequence of which liquid passes from said filter compartment through said first interconnecting passageway bypassing the inlet to said second conduit and into said primary settlement tank;
  and chemical treating means disposed within said final settlement tank and periodically energizable for killing septical organics in the liquid in said final settlement tank.

3. An automatic sewage disposal unit comprising:
  a primary settlement tank for receiving liquid raw sewage;
  an enclosed filter compartment disposed above said primary settlement tank and containing a biologically active filter bed;
  a partially enclosed final settlement tank disposed adjacent said filter compartment and said primary settlement tank and being in communication near the top thereof with the top of said filter compartment;
  means for conveying the liquid from said primary settlement tank to said filter compartment and distributing it over said filter bed;
  means for conducting the liquid from said filter bed either in return to said primary settlement tank for recirculation from the latter to said filter bed or to said final settlement tank, said conducting means comprising:
    a first conduit having an inlet in the filter compartment and an outlet in the primary settlement tank and forming a first interconnecting passageway between said filter compartment and said primary settlement tank;
    a second conduit having an inlet in said first conduit and an outlet in the final settlement tank and forming a second interconnecting passageway between said filter compartment and said final settlement tank;

and valve means (*a*) adapted to close the outlet of said first conduit when the liquid in said primary settlement tank rises to a predetermined level, as a consequence of which liquid passes from said filter compartment through said second interconnecting passageway into said final settlement tank, (*b*) and further adapted to open the outlet of said first conduit when the liquid in said primary settlement tank falls below said predetermined level, as a consequence of which liquid passes from said filter compartment through said first interconnecting passageway bypassing the inlet to said second conduit and into said primary settlement tank;

and means for circulating air from said final settlement tank to said filter compartment downwardly through said biologically active filter bed.

References Cited in the file of this patent

UNITED STATES PATENTS

| | | |
|---|---|---|
| 1,307,686 | Linden | June 24, 1919 |
| 2,008,507 | Laughlin | July 16, 1935 |
| 2,141,979 | Halvorson et al. | Dec. 27, 1938 |
| 2,355,640 | Fischer et al. | Aug. 15, 1944 |
| 2,553,228 | Yonner | May 15, 1951 |

OTHER REFERENCES

"High Capacity Filtration; The Biofiltration System," Bachman, Sewage Works J., September 1941, pp. 895–904.

"The Recirculating High Rate Filter in Industrial Waste Treatment," Eldridge, Water Works & Sewerage, November 1941, vol. 88, pp. 483–490.

"Treating Organic Wastes on Experimental Trickling Filters," Vogler, Water & Sewage Works, July 1954, pp. 316–323.